(12) United States Patent
Schinke et al.

(10) Patent No.: US 8,672,382 B2
(45) Date of Patent: Mar. 18, 2014

(54) PEDESTRIAN PROTECTION SYSTEM FOR A MOTOR VEHICLE

(75) Inventors: Stefan Schinke, Braunschweig (DE); Thorsten Gaas, Dedelstorf-Repke (DE); Andre Zander, Magdeburg (DE)

(73) Assignee: Volkswagen AG, Wolfsburg (DE)

(*) Notice: Subject to any disclaimer, the term of this patent is extended or adjusted under 35 U.S.C. 154(b) by 883 days.

(21) Appl. No.: 11/596,450

(22) PCT Filed: Apr. 20, 2005

(86) PCT No.: PCT/EP2005/004190
§ 371 (c)(1),
(2), (4) Date: Aug. 9, 2007

(87) PCT Pub. No.: WO2005/110816
PCT Pub. Date: Nov. 24, 2005

(65) Prior Publication Data
US 2008/0122231 A1    May 29, 2008

(30) Foreign Application Priority Data
May 13, 2004    (DE) .......................... 10 2004 023 669

(51) Int. Cl.
*B60R 19/02*    (2006.01)
(52) U.S. Cl.
USPC ........... 296/4; 293/117; 296/187.04; 180/274
(58) Field of Classification Search
USPC ........... 293/4, 117; 296/187.04; 180/274, 282
See application file for complete search history.

(56) References Cited

U.S. PATENT DOCUMENTS

| 5,154,462 | A  | * | 10/1992 | Carpenter ..................... 293/120 |
| 6,540,275 | B1 | * | 4/2003  | Iwamoto et al. ................ 293/24 |
| 6,607,212 | B1 |   | 8/2003  | Reimer et al. |
| 6,637,788 | B1 | * | 10/2003 | Zollner et al. ................ 293/107 |
| 6,784,792 | B2 | * | 8/2004  | Mattes et al. ................. 340/436 |
| 6,882,916 | B2 | * | 4/2005  | Takafuji et al. ................ 701/45 |
| 7,575,259 | B2 | * | 8/2009  | Hasegawa ..................... 293/120 |

FOREIGN PATENT DOCUMENTS

| DE | 100 16 142      |   | 4/2002  |
| EP | 0 914 992       |   | 5/1999  |
| EP | 0 952 046       |   | 10/1999 |
| EP | 1 281 582       |   | 2/2003  |
| JP | 60-139552       |   | 7/1985  |
| JP | 2000-25562      | * | 1/2000  |
| JP | 2000025562 A    | * | 1/2000  |
| WO | WO 03/082639    |   | 10/2003 |
| WO | WO 2005/019001  |   | 3/2005  |

OTHER PUBLICATIONS

English-language translation of the International Preliminary Report on Patentability, PCT International Patent Application No. PCT/EP2005/004190 dated Dec. 14, 2006.

(Continued)

*Primary Examiner* — Dennis Pedder
(74) *Attorney, Agent, or Firm* — Kenyon & Kenyon LLP

(57) ABSTRACT

A pedestrian protection system for a motor vehicle includes an impact recognition sensor for recognizing an impact of the motor vehicle with a pedestrian. The impact recognition sensor is located in a front fender of the motor vehicle, next to an outer skin that lines the fender, or in a front part of the motor vehicle, next to an outer skin that lines the front part of the motor vehicle.

15 Claims, 3 Drawing Sheets

(56) References Cited

OTHER PUBLICATIONS

Patent Abstracts of Japan, vol. 009, No. 303 (M-434), Nov. 30, 1985.
International Search Report, PCT International Patent Application No. PCT/EP2005/004190, Jul. 26, 2005.

Written Opinion of the International Searching Authority, PCT International Patent Application No. PCT/EP2005/004190, Jul. 26, 2005 (English-language translation provided).

* cited by examiner

PEDESTRIAN PROTECTION SYSTEM FOR A MOTOR VEHICLE

FIELD OF THE INVENTION

The present invention relates to a pedestrian protection system for a motor vehicle, e.g., having an impact detection sensor for detecting an impact of a pedestrian on the motor vehicle as well as a bumper for a motor vehicle, the bumper including a support made of a stiff material, an outer skin for covering the bumper and an elastic layer situated between the support and the outer skin.

BACKGROUND INFORMATION

Pedestrian protection systems are described, e.g., in European Published Patent Application No. 0 914 992 and German Published Patent Application No. 100 16 142 as well as from the related art discussed in German Published Patent Application No. 100 16 142. German Published Patent Application No. 100 16 142 describes, e.g., a person protection system having a trigger switch, the trigger switch having a first pair of contacts and at least one second pair of contacts which is operable by pressure and by which an electric circuit may be closed and thereby a contact signal produced, the first and the second pair of contacts being situated at a spatial distance from each other.

SUMMARY

Example embodiments of the present invention may provide an improved pedestrian protection system. For this purpose it is desirable to find a particularly good compromise between a low false triggering of the pedestrian protection system, a reliable triggering of the pedestrian protection system in the event of an impact of a pedestrian on the motor vehicle and a quick triggering of the pedestrian protection system in the event of an impact of a pedestrian on the motor vehicle.

A pedestrian protection system for a motor vehicle may include an impact detection sensor for detecting an impact of a pedestrian on the motor vehicle, the impact detection sensor being situated in a front bumper of the motor vehicle near an outer skin for covering the bumper and/or in a front part of the motor vehicle near an outer skin for covering the front part of the motor vehicle. In this connection, when a collision with a pedestrian is detected, the impact detection sensor may trigger a protective mechanism such as, e.g., a raising of an engine hood as described, e.g., in German Published Patent Application No. 100 16 142.

The impact detection sensor may have a side facing the outer skin and a side facing away from the outer skin, the side of the impact detection sensor facing away from the outer skin being, e.g., less than 25 mm away from the outer skin. The side of the impact detection sensor facing the outer skin may substantially or nearly touch the outer skin.

A bumper for a motor vehicle includes a support made of a stiff material, e.g., steel, an outer skin for covering the bumper and an elastic layer (such as, e.g., a foam member) situated between the support and the outer skin, and the bumper having an impact detection sensor, situated between the support and the outer skin near the outer skin, for detecting an impact of a pedestrian on the motor vehicle. In this connection, when a collision with a pedestrian is detected, the impact detection sensor may trigger a protective mechanism such as, e.g., a raising of an engine hood as described, e.g., in German Published Patent Application No. 100 16 142.

The impact detection sensor may have a side facing the outer skin and a side facing away from the outer skin, the side of the impact detection sensor facing away from the outer skin being, e.g., less than 25 mm away from the outer skin. The side of the impact detection sensor facing away from the outer skin essentially or nearly touches the elastic layer.

In another advantageous refinement of the present invention, the side of the impact detection sensor facing the outer skin may substantially or nearly touch the outer skin.

The elastic layer may include foamed material or may be made up substantially of foamed material.

A motor vehicle—e.g., including the above-mentioned characteristics—may have a first impact detection sensor for detecting an impact of a pedestrian on the motor vehicle and at least one second impact detection sensor for detecting an impact of a pedestrian on the motor vehicle, the first impact detection sensor being situated in a front bumper of the motor vehicle, e.g., at a distance of less than 25 mm from an outer skin for covering the bumper and/or in a front part of the motor vehicle at a distance of less than 25 mm, e.g., less than 10 mm, from an outer skin for covering the front part of the motor vehicle, and the second impact detection sensor, e.g., being situated on a pedestrian protection support of the motor vehicle.

Impact detection sensors may be, e.g., contact sensors (such as fiber-optic sensors for example), force sensors or sensors arranged according to the sensor described in German Published Patent Application No. 100 16 142.

An arrangement near an outer skin may include an arrangement at a distance of, e.g., less than 25 mm, e.g., less than 10 mm, from the outer skin.

A motor vehicle may include a land vehicle that may be used individually in road traffic. Motor vehicles are not, however, restricted to land vehicles having an internal combustion engine.

Further aspects and details of exemplary embodiments of the present invention are described below with reference to the appended Figures.

DETAILED DESCRIPTION

Figure 1:
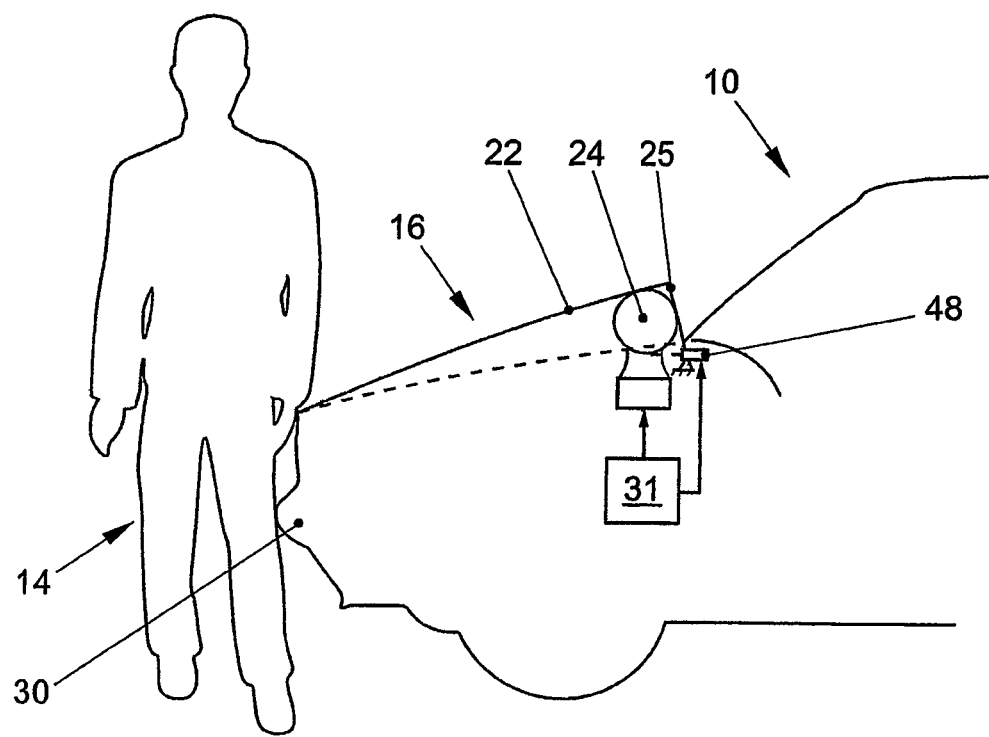
FIG. 1 illustrates an exemplary embodiment of a pedestrian protection system of a motor vehicle.

FIG. 1 illustrates a pedestrian protection system 16, modified with respect to the person protection system described, e.g., in German Published Patent Application No. 100 16 142, for a motor vehicle 10 for protecting pedestrians 14.

The pedestrian protection system 16 has a raisable engine hood 22, which is raisable using an engine hood airbag device 24. In order to prevent a firing of engine hood airbag device 24 from raising engine hood 22 more than a predefined distance, an engine hood catching device 25 in the form of a cable line, a chain or a stop is provided. Engine hood includes, e.g., a covering of a space lying in front of a passenger compartment of a motor vehicle.

Pedestrian protection system 16 includes a control system 31 by which the engine hood airbag device 24 is triggered if a collision with a pedestrian 14 is detected by an impact detection sensor 32 illustrated in FIG. 1 and situated in a front bumper 30. For this purpose, control system 31 and impact detection sensor 32 are suitably connected to each other in terms of data technology.

If the velocity of the motor vehicle, which is determinable with the aid of impact detection sensor 32 using an impact detection sensor, such as that described, e.g., in German Published Patent Application No. 100 16 142, lies within a predefined velocity window of, e.g., 20 km/h to 50 km/h, then the pyrotechnic charge of engine hood airbag device 24 is triggered. If the velocity lies above the velocity window, then control system 31 locks engine hood 22 using a locking device 48, which, e.g., secures catching device 25. An activation of the pyrotechnic charge of engine hood airbag device 24 does not occur.

Figure 2:
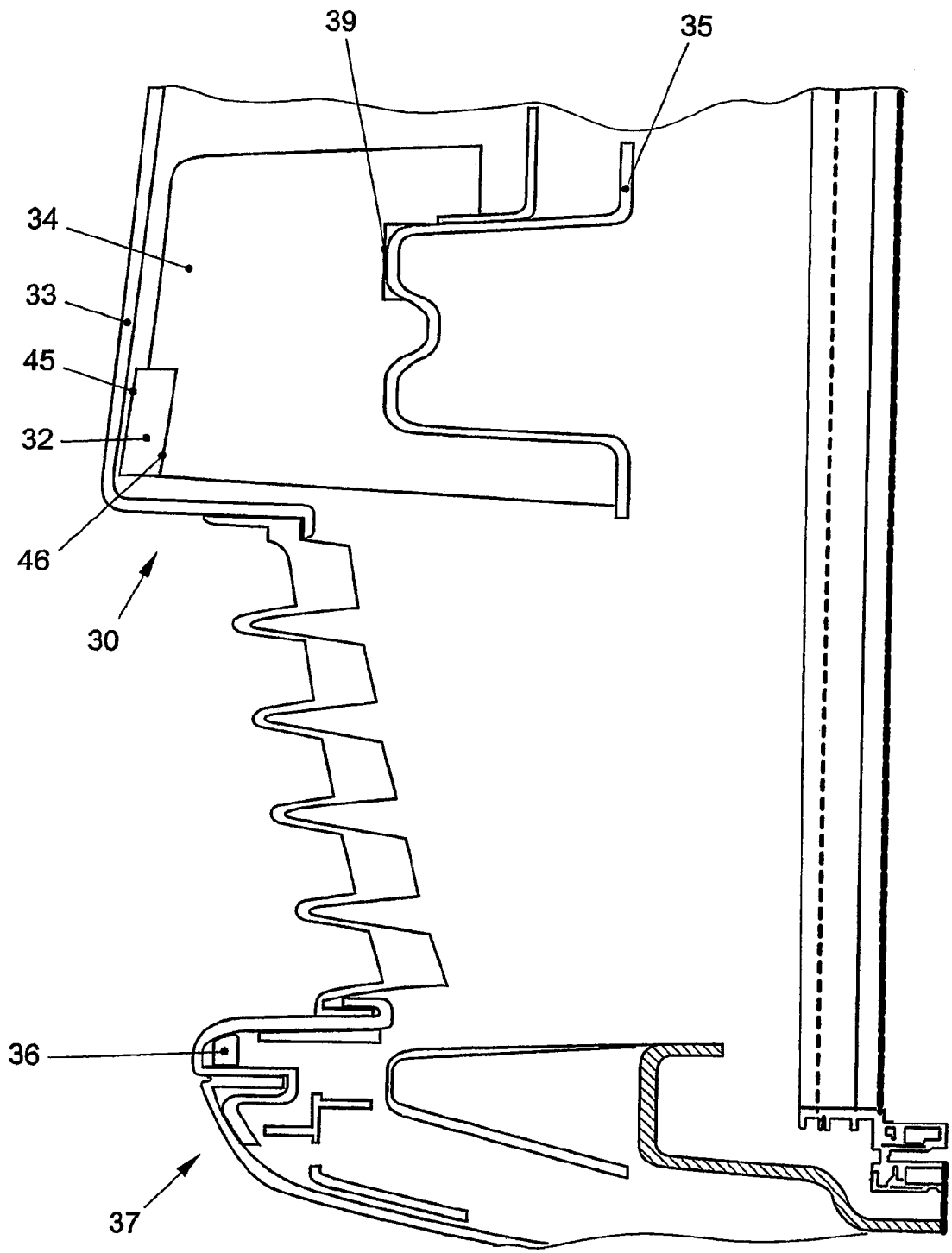
FIG. 2 is a cross-sectional view through a segment of the front part of the motor vehicle illustrated in FIG. 1.

FIG. 2 is a cross-sectional view through a segment of the front part of motor vehicle 10 including bumper 30 in a detailed view. Bumper 30 includes a steel support 35, on whose side 39 facing the front side of motor vehicle 10 a solid or honeycomb-structured foam member 34 is situated. Foam member 34 is covered by an outer skin 33.

Bumper 30 has an impact detection sensor 32 situated between steel support 35 and outer skin 33—e.g., between foam member 34 and outer skin 33—at a distance of, e.g., less than 25 mm from the outer skin. The present exemplary embodiment provides for impact detection sensor 32 or for side 45 of impact detection sensor 32 facing outer skin 33 substantially or nearly to touch outer skin 33. Side 46 of impact detection sensor 32 facing away from outer skin 33 is, e.g., less than 25 mm away from outer skin 33. In addition, side 46 of impact detection sensor 32 facing away from outer skin 33 substantially or nearly touches foam member 34.

There may be an optional provision for motor vehicle 10 to have at least one additional impact detection sensor 36 for detecting an impact of a pedestrian 14 in or on a pedestrian protection support 37 of motor vehicle 10. In this instance, there may be a provision for control system 31 to evaluate also a time difference between a signal of impact detection sensor 32 indicating an impact and a signal of impact detection sensor 36 indicating an impact in order to differentiate between an impact of a pedestrian 14 from an impact of an object, for example.

Impact detection sensors 32 and 36 may be, e.g., contact sensors (such as fiber-optic sensors, for example), force sensors or sensors arranged according to the sensor described, e.g., in German Published Patent Application No. 100 16 142. Sensors arranged in accordance with the sensor described in German Published Patent Application No. 100 16 142, that is, sensors having at least one, e.g., two pairs of contacts, which by contact close an electric circuit in the event of an impact, may be provided for impact detection sensor 32, that is, an impact detection sensor situated in a bumper.

Figure 3:
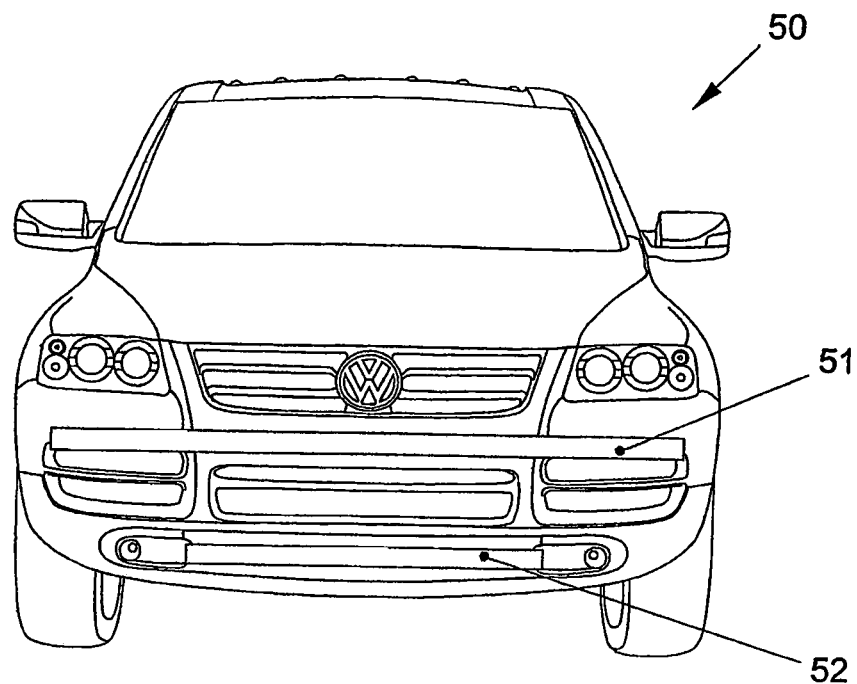
FIG. 3 is a front view of a motor vehicle.
Figure 4:
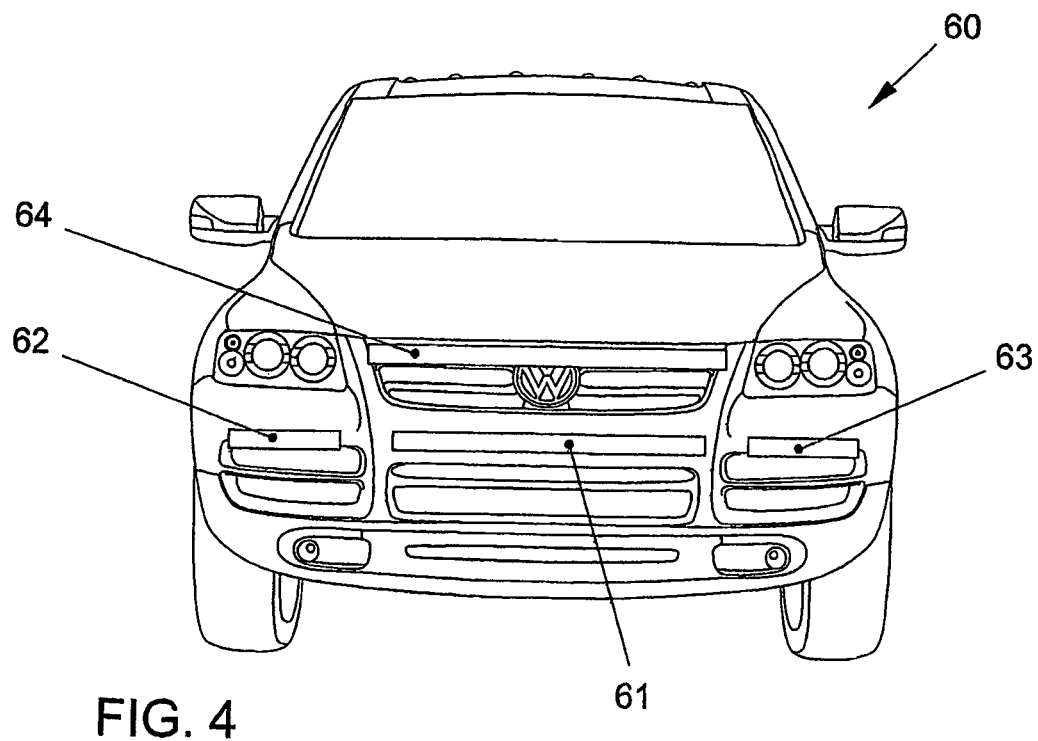
FIG. 4 is another front view of a motor vehicle.

FIG. 3 and FIG. 4 each show a front view of a motor vehicle 50 or 60. In this instance, reference numerals 51, 52, 61, 62, 63 and 64 indicate regions (e.g., not visible from outside), in which impact detection sensors may be situated in a segmented or in a continuous manner. Thus, e.g., motor vehicle 50 may correspond to motor vehicle 10, it being possible for impact detection sensor 32 to be situated in a segmented or in a continuous manner in region 51 and impact detection sensor 36 to be situated in a segmented or in a continuous manner in region 52. Motor vehicle 60 may also correspond to motor vehicle 10, for example, it being possible for impact detection sensor 32 to be situated in a segmented or in a continuous manner in regions 61, 62 and 63. There may also be a provision, alternatively or additionally to impact detection sensor 36, for an impact detection sensor to be situated in region 64.

LIST OF REFERENCE NUMERALS 10, 50, 60 motor vehicle
14 pedestrian
16 pedestrian protection system
22 engine hood
24 engine hood airbag device
25 engine hood catching device
30 bumper
31 control system
32, 36 impact detection sensor
33 outer skin
34 foam member
35 steel support
37 pedestrian protection support
39 side of a steel support facing the front side of a motor vehicle
45 side of an impact detection sensor facing the outer skin
46 side of an impact detection sensor facing away from the outer skin
48 locking device
51, 52, 61, 62,
63, 64 region

What is claimed is:

1. A pedestrian protection system for a motor vehicle, comprising:
at least one first impact detection sensor adapted to detect an impact of a pedestrian on the motor vehicle, the first impact detection sensor arranged one of (a) in a front bumper of the motor vehicle and nearly touching an outer skin for covering the bumper;
at least one second impact detection sensor arranged below the at least one first impact detection sensor, the second impact detection sensor arranged on a pedestrian protection support of the motor vehicle; and
a control unit configured to evaluate signals of the first and second impact detection sensors and differentiate between the impact of the pedestrian and an impact of an object.

2. The pedestrian protection system according to claim 1, wherein the first impact detection sensor includes a side facing the outer skin and a side facing away from the outer skin, the side facing away from the outer skin less than 25 mm away from the outer skin.

3. The pedestrian protection system according to claim 2, wherein the side facing the outer skin nearly touches the outer skin.

4. A protection system having a bumper for a motor vehicle, comprising:
a support made of a stiff material;
an outer skin covering the bumper;
an elastic layer arranged between the support and the outer skin; and
at least one first impact detection sensor arranged between the support and the outer skin and nearly touching the outer skin and adapted to detect an impact of a pedestrian on the motor vehicle;
at least one second impact detection sensor arranged below the at least one first impact detection sensor, the second impact detection sensor arranged on a pedestrian protection support of the motor vehicle; and a control unit configured to evaluate signals of the first and second impact detection sensors and differentiate between the impact of the pedestrian and an impact of an object.

5. The protection system according to claim 4, wherein the first impact detection sensor includes a side facing the outer skin and a side facing away from the outer skin, the side facing away from the outer skin less than 25 mm away from the outer skin.

6. The protection system according to claim 5, wherein the side facing away from the outer skin nearly touches the elastic layer.

7. The protection system bumper according to claim 5, wherein the side facing the outer skin nearly touches the outer skin.

8. The protection system according to claim 6, wherein the side facing the outer skin nearly touches the outer skin.

9. The protection system according to claim 4, wherein the stiff material includes steel.

10. The protection system according to claim 4, wherein the elastic layer includes foamed material.

11. The protection system according to claim 4, wherein the elastic layer is substantially made of foamed material.

12. A motor vehicle, comprising:
 a bumper for the motor vehicle including: a support made of a stiff material; an outer skin covering the bumper; an elastic layer arranged between the support and the outer skin; and at least one first impact detection sensor arranged between the support and the outer skin and nearly touching the outer skin and adapted to detect the impact of the pedestrian on the motor vehicle; and
 at least one second impact detection sensor arranged below the at least one first impact detection sensor, the second impact detection sensor arranged on a pedestrian protection support of the motor vehicle;
 a control unit configured to evaluate signals of the first and second impact detection sensors and differentiate between the impact of the pedestrian and an impact of an object.

13. The pedestrian protection system according to claim 1, wherein the control unit is configured to evaluate a time difference between the signals of the first and second impact detection sensors to differentiate between the impact of the pedestrian and the impact of the object.

14. The protection system according to claim 4, wherein the control unit is configured to evaluate a time difference between the signals of the first and second impact detection sensors to differentiate between the impact of the pedestrian and the impact of the object.

15. The motor vehicle according to claim 12, wherein the control unit is configured to evaluate a time difference between the signals of the first and second impact detection sensors to differentiate between the impact of the pedestrian and the impact of the object.

* * * * *

UNITED STATES PATENT AND TRADEMARK OFFICE
CERTIFICATE OF CORRECTION

PATENT NO.      : 8,672,382 B2                                          Page 1 of 1
APPLICATION NO. : 11/596450
DATED           : March 18, 2014
INVENTOR(S)     : Schinke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 226 days.

Signed and Sealed this

Twenty-ninth Day of September, 2015

Michelle K. Lee
*Director of the United States Patent and Trademark Office*